United States Patent [19]

Bonnet

[11] Patent Number: 5,372,238
[45] Date of Patent: Dec. 13, 1994

[54] METHOD AND APPARATUS FOR SINGULARIZING OBJECTS

[75] Inventor: Henri Bonnet, Atlanta, Ga.

[73] Assignee: United Parcel Service of America, Inc., Atlanta, Ga.

[21] Appl. No.: 122,730

[22] Filed: Sep. 13, 1993

[51] Int. Cl.⁵ .............................................. B65G 47/12
[52] U.S. Cl. .................................................. 198/455
[58] Field of Search ................ 198/443, 444, 453–455, 198/954, 365; 209/900, 939

[56] References Cited

U.S. PATENT DOCUMENTS

| | | | |
|---|---|---|---|
| 2,373,600 | 4/1945 | Richey . | |
| 2,629,481 | 2/1953 | Stover . | |
| 3,490,574 | 1/1970 | Taylor et al. . | |
| 3,604,551 | 9/1971 | Fink . | |
| 4,252,232 | 2/1981 | Beck et al. | 198/443 |
| 4,291,797 | 9/1981 | Ewertowski | 198/365 |
| 4,815,580 | 3/1989 | Schanz et al. . | |
| 4,889,224 | 12/1989 | Denker | 198/454 |
| 4,925,003 | 5/1990 | Limoni . | |
| 5,078,257 | 1/1992 | Carter | 198/365 |

Primary Examiner—Joseph E. Valenza
Attorney, Agent, or Firm—Steve Mendelsohn; Robert E. Rosenthal; William H. Murray

[57] ABSTRACT

A method and apparatus for transforming a stream of non-singularized objects (e.g., packages) into a stream of singularized objects. A rotating conveyor receives non-singularized objects from an input conveyor and transmits singularized objects to an output conveyor. The rotating conveyor has one or more reversible sectors that independently and selectively drive the objects toward and away from the axis of rotation as the objects are rotated upon the rotating conveyor. The objects may be driven into contact with and urged downstream by a vertical conveyor adjacent to the rotating conveyor and the output conveyor. A return conveyor may remove non-singularized objects from the output conveyor and return those objects to the rotating conveyor. A reinjection conveyor may reinject those objects into the non-singularized stream of the input conveyor to ensure singularization and handle temporary increases in the volume of object flow.

45 Claims, 3 Drawing Sheets

METHOD AND APPARATUS FOR SINGULARIZING OBJECTS

BACKGROUND OF THE INVENTION

1. Field of the Invention

The present invention relates to conveying packages or other objects, and, in particular, to methods and apparatuses for singularizing packages in a non-singularized stream.

2. Description of the Related Art

In the field of package shipping, conveyors are used to move packages for such tasks as loading, unloading, and sorting in distribution centers before and after long-distance shipment. For example, packages may be unloaded from a truck bed onto a conveyor after transporting the packages between distribution centers.

In order to track and/or sort the packages throughout their journey from source to desired destination, labels are affixed to the packages that contain information that uniquely identifies each package and its destination.

One type of automated package sorting or tracking system has a scanner or camera positioned over the conveyor and a computer to read the imaged labels as each package passes under the scanner or camera. It is desirable for the stream of packages to be singularized (i.e., in single file) and justified (i.e., oriented along one side of the conveyor) at the time the labels are imaged by the overhead scanner or camera. However, packages may be loaded onto conveyors in a non-singularized, unjustified stream (e.g., randomly placed on the conveyor system with two or more packages side by side).

What is needed is a device for transforming a non-singularized, unjustified stream of packages into a singularized, justified stream of packages for imaging by the overhead scanner or camera of a package sorting system. It is desirable for such a device to perform this singularizing function in a compact, reliable, and cost-effective manner. The device should be gentle enough to avoid damaging the packages. To be cost effective, the device should have a high throughput.

It is accordingly an object of this invention to overcome the disadvantages and drawbacks of the known art and to provide methods and apparatuses for singularizing and justifying packages as they are transported along a conveyor.

It is a further object of this invention to provide a relatively compact and inexpensive apparatus for gently and reliably singularizing and justifying packages on a conveyor at a high capacity.

It is a general object of this invention to provide methods and apparatuses for singularizing packages or other objects.

Further objects and advantages of this invention will become apparent from the detailed description of a preferred embodiment which follows.

SUMMARY OF THE INVENTION

The present invention is an apparatus for singularizing objects. Rotating means, rotatable about an axis of rotation, receives two or more objects in a non-singularized stream, rotates the objects about the axis of rotation, and transmits the objects in a singularized stream. The rotating means comprises one or more reversible sectors for conveying the objects towards the axis of rotation during a first portion of the rotation of the rotating means and for conveying the objects away from the axis of rotation during a second portion of the rotation of the rotating means.

The present invention is also a method for singularizing objects. Two or more objects are received in a non-singularized stream from an upstream source. The objects are then rotated about an axis of rotation, conveyed towards the axis of rotation during a first portion of the rotation of the objects, and conveyed away from the axis of rotation during a second portion of the rotation of the objects. The objects are then transmitted in a singularized stream to a downstream destination.

The present invention is also an apparatus for singularizing objects comprising substantially horizontal conveying means, output means, and substantially vertical conveying means. The substantially horizontal conveying means conveys two or more non-singularized objects in a first substantially horizontal direction. The output means receives the objects from the horizontal means and conveys the objects in a second substantially horizontal direction. The substantially vertical conveying means is adjacent to the horizontal means and the output means. The horizontal means drives the objects into contact with the vertical means and the vertical means urges the objects in the second direction and onto the output means.

The present invention is also a method for singularizing objects. Two or more non-singularized objects are moved upon a first substantially horizontal surface in a first direction into contact with a substantially vertical surface. The objects are urged by the vertical surface in a second direction onto a second substantially horizontal surface. The singularized objects are then moved upon the second horizontal surface in the second direction.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

Figure 1:
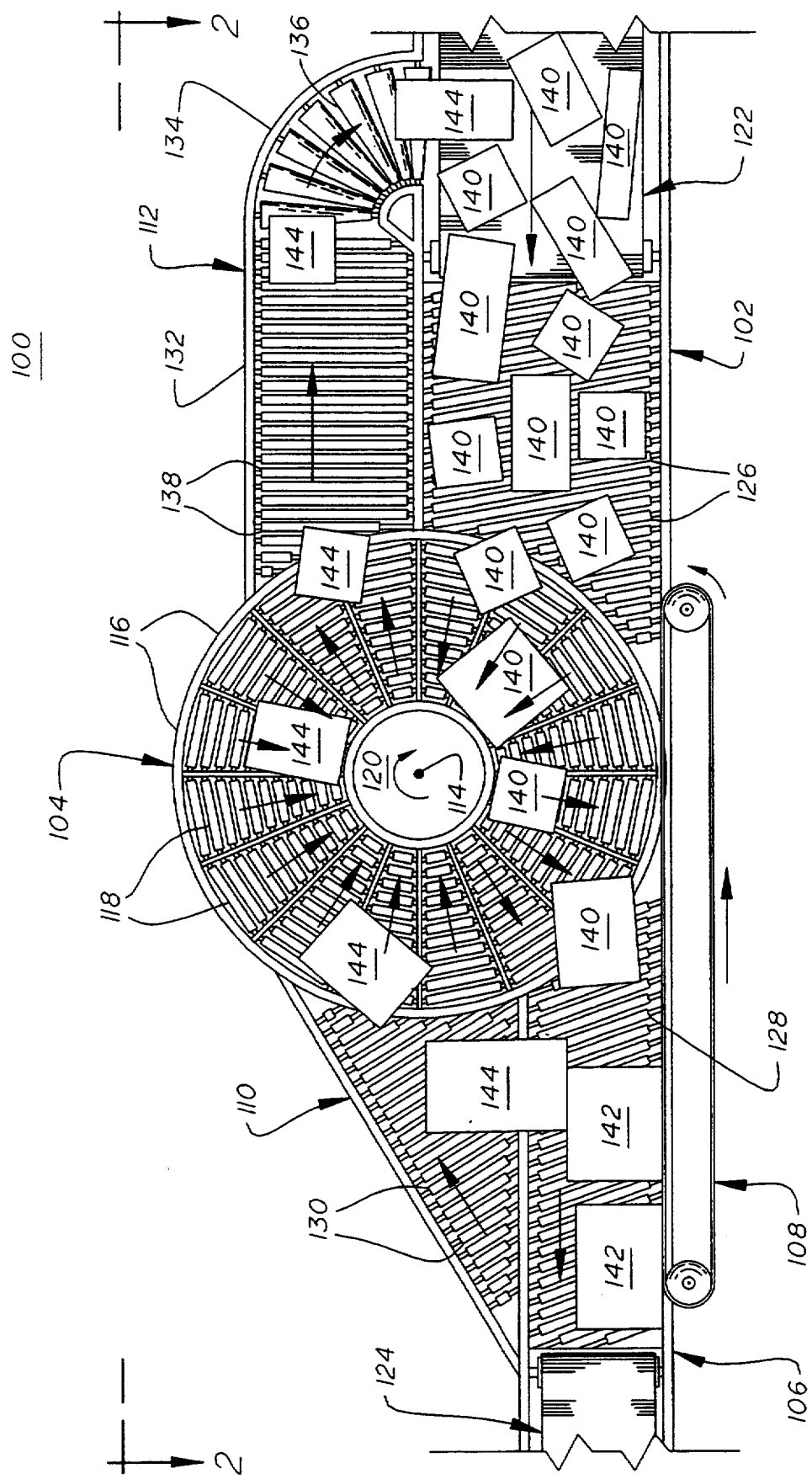
FIGS. 1 and 2 are a schematic plan view and a schematic side view, respectively, of a singularizer apparatus for singularizing packages, according to a preferred embodiment of the present invention.
Figure 2:
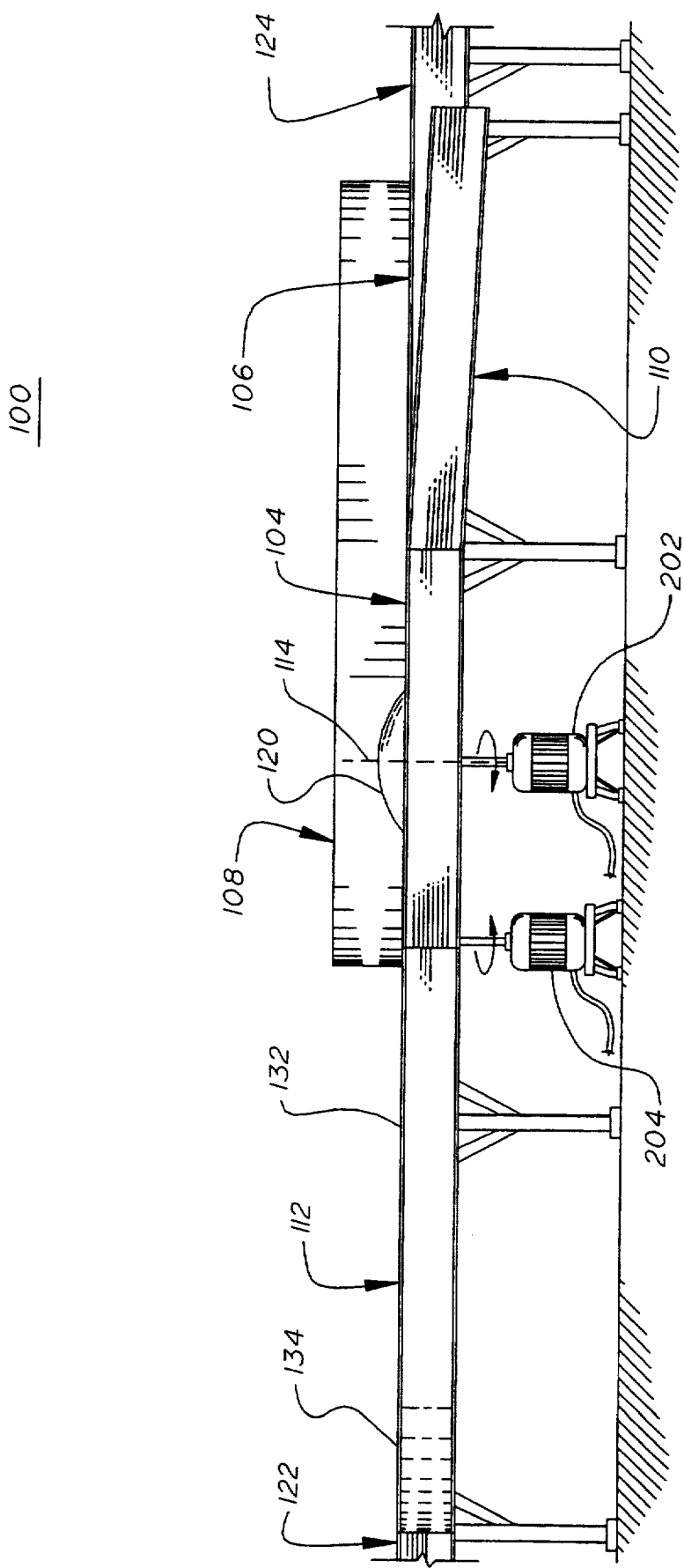

Referring now to FIGS. 1 and 2, there are shown a schematic plan view and a schematic side view, respectively, of singularizer apparatus 100 for singularizing packages, according to a preferred embodiment of the present invention. Apparatus 100 comprises input conveyor 102, rotating conveyor 104, output conveyor 106, vertical belt conveyor 108, return conveyor 110, and reinjection conveyor 112. In an alternative preferred embodiment of the present invention, apparatus 100 has no reinjection conveyor 112.

The heart of singularizer apparatus 100 is rotating conveyor 104. Rotating conveyor 104 provides a substantially horizontal, circular, planar surface upon which packages are rotated about a central vertical axis of rotation 114. Rotating conveyor 104 is rotated clockwise (in FIG. 1) by dedicated motor 202 of FIG. 2. Rotating conveyor 104 is divided radially into a plurality of reversible sectors 116 (e.g., sixteen). In a preferred embodiment, each reversible sector 116 contains a plurality of parallel, circumferential, reversible live rollers 118 that may be driven by a dedicated drive system (e.g., motor and linkage) (not shown) to move packages radially either inward towards or outward away from the axis of rotation 114. The upper edges of live rollers 118 are coplanar and define the horizontal, circular planar surface of rotating conveyor 104. Each reversible sector 116 may be driven independently of each other reversible sector 116. In an alternative preferred embodiment, each individual live roller 118 may be individually motorized (i.e., with a motor inside the roller 118).

The rotation of rotating conveyor 104 is divided into four different portions. As shown in FIG. 1, with rotating conveyor 104 radially divided into sixteen identical reversible sectors 116, the first portion of the rotation is the lower right portion (about 90 degrees), the second portion is the lower left portion (about 67.5 degrees), the third portion is the upper left portion (about 157.5 degrees), and the fourth portion is the upper right portion (about 45 degrees). Alternative preferred embodiments may employ different schemes for dividing the rotation of the rotating conveyor.

At the center of rotating conveyor 104 is hubcap 120. Hubcap 120, which is preferably a spherical section, is sufficiently high and/or steep to provide a package stop during normal operations by preventing a package from sliding past the center of rotating conveyor 104 as packages are driven radially inward towards axis of rotation 114. Nevertheless, hubcap 120 is sufficiently smooth and low to allow a package to slide over hubcap 120 (e.g., from the first portion onto the third portion of rotation), if the package pressure against hubcap 120 becomes too great (e.g., during high package volume). In this way, hubcap 120 provides package pressure relief and acts as an anti-jam mechanism.

Input conveyor 102 and output conveyor 106 both provide substantially horizontal planar surfaces over which packages move downstream. For purposes of this discussion, downstream motion is defined as motion from right to left and upstream motion is defined as motion from left to right in FIG. 1. The upstream end of input conveyor 102 abuts the downstream end of an upstream conveyor 122. The downstream end of input conveyor 102 has a curved profile that abuts rotating conveyor 104 in the first portion of rotation. The upstream end of output conveyor 106 has a curved profile that abuts rotating conveyor 104 in the second portion of rotation. The downstream end of output conveyor 106 abuts the upstream end of a downstream conveyor 124

In a preferred embodiment, input conveyor 102 comprises a plurality of live rollers 126 that may be driven by a dedicated drive system (not shown). Alternatively, each live roller 126 may be driven by an individual internal motor (not shown). Similarly, output conveyor 106 preferably comprises a plurality of live rollers 128 that may be driven by a dedicated drive system (not shown). Alternatively, each live roller 128 may be driven by an individual internal motor (not shown). Live rollers 126 and 128 are preferably skewed to drive packages towards the left (in FIG. 1). A roller is skewed if its axis of rotation is not perpendicular to the downstream direction. Alternatively, live rollers 126 and 128 may be tapered to drive packages towards the left (in FIG. 1). A tapered roller has a gradually increasing diameter along its axis of rotation. Like skewed rollers, tapered rollers may be used to change the direction of flow of packages.

Vertical belt conveyor 108 provides a substantially vertical, planar surface tangential to rotating conveyor 104 and adjacent to output conveyor 106. The surface of vertical conveyor 108 moves in the downstream direction to urge packages in the downstream direction, thereby assisting in the singularization and downstream propagation of packages upon output conveyor 106. Vertical conveyor 108 is driven counter-clockwise (in FIG. 1) by dedicated motor 204 of FIG. 2.

Return conveyor 110 provides a substantially horizontal, substantially triangular, planar surface for moving packages substantially upstream. The left side of return conveyor 110 abuts the right side of output conveyor 106 (in FIG. 1) and is slightly lower than output conveyor 106. The base of the triangle defined by return conveyor 110 has a curved profile that abuts rotating conveyor 104 in the third portion of rotation. In a preferred embodiment, return conveyor 110 comprises a plurality of live rollers 130 that are driven by a dedicated drive system (not shown). Alternatively, each live roller 130 may be driven by an individual internal motor (not shown).

Reinjection conveyor 112 provides a planar surface for moving packages first substantially upstream and then curving the flow of packages to re-enter the non-singularized stream of packages. Reinjection conveyor 112 comprises straight saturation section 132 and quarter-circular re-entry section 134. The downstream end of saturation section 132 has a curved profile that abuts rotating conveyor 104 in the fourth portion of rotation. The upstream end of saturation section 132 abuts the downstream end of re-entry section 134. The other end of re-entry section 134 abuts the right side (in FIG. 1) of upstream conveyor 122 in the embodiment of FIG. 1, but may, in an alternative preferred embodiment, abut the right side of input conveyor 102.

Re-entry section 134 preferably comprises a plurality of tapered live rollers 136 that are driven by a dedicated drive system (not shown). Alternatively, each live roller 136 may be driven by an individual internal motor (not shown). In a preferred embodiment, saturation section 132 comprises live (i.e., active) rollers 138. Rollers 138 may be driven either by a dedicated drive system or by the same drive system that drives live rollers 136 of re-entry section 134, depending upon the particular embodiment. Alternatively, each live roller 138 may be driven by an individual internal motor (not shown). In another alternative preferred embodiment, rollers 138 are idle (i.e., passive) rollers.

In operation, according to a preferred embodiment, packages 140 are conveyed along upstream conveyor 122 in a non-singularized, unjustified stream and transmitted to (i.e., deposited onto) input conveyor 102 of apparatus 100. Input conveyor 102 transmits packages 140 to rotating conveyor 104 as rotating conveyor 104 rotates about axis of rotation 114 (clockwise in FIG. 1). As packages 140 are rotated upon rotating conveyor 104 through the first portion of rotation, reversible sectors 116 drive packages 140 radially inward towards axis of rotation 114.

As each reversible sector 116 enters the second portion of rotation, the live rollers 118 of the reversible sector 116 reverse rotational direction. As such, as packages 140 are rotated upon rotating conveyor 104 through the second portion of rotation, reversible sectors 116 drive packages 140 radially outward away from axis of rotation 114 and toward vertical belt conveyor 108 and output conveyor 106. Reversible sectors 116 drive packages 140 radially into contact with vertical conveyor 108 and onto output conveyor 106, both of which drive packages 140 in the downstream direction.

The speed of reversible sectors 116 relative to the angular velocity of rotating conveyor 104 affects the position along vertical conveyor 108 and the angle at which packages 140 contact vertical conveyor 108. The angle will range from approximately perpendicular to the downstream direction when the speed of reversible sectors 116 is much greater than the angular velocity of rotating conveyor 104 to approximately parallel to the downstream direction when the speed of reversible sectors 116 is much less than the angular velocity of rotating conveyor 104. The preferred angle is approximately 50 degrees, where 0 degrees is parallel to downstream and 90 degrees is perpendicular to downstream.

In a preferred embodiment, reversible sectors 116 drive packages 140 in a direction different from the downstream direction into contact with vertical conveyor 108. Upon contact, vertical conveyor 108 (whose surface moves in the downstream direction), urges packages 140 in the downstream direction and onto output conveyor 106, which also moves packages 140, preferably in the downstream direction. The driving of packages 140 in a radial direction by reversible sectors 116 into contact with vertical belt conveyor 108 (which urges packages 140 downstream in a direction different from the radial direction) and onto output conveyor 106 (which further conveys packages 140 downstream) contributes to the singularization of packages 140. The contact between packages 140 and vertical conveyor 108 may cause packages to pivot (i.e., rotate about an internal axis of rotation). Those skilled in the art will understand that this pivoting may destabilize non-singularized packages for singularized transmission to output conveyor 106. Output conveyor 106 then transmits singularized packages 142 to downstream conveyor 124.

If packages 140 are not singularized as they are transmitted from rotating conveyor 104 to output conveyor 106, the right-most (in FIG. 1) non-singularized package(s) 144 may be automatically removed from output conveyor 106 to return conveyor 110, which returns non-singularized packages 144 to rotating conveyor 104 at the start of the third portion of rotation. As each reversible sector 116 enters the third portion of rotation, the roller rotation direction is reversed. Thus, as non-singularized packages 144 are rotated upon rotating conveyor 104 through the third portion of rotation, reversible sectors 116 drive non-singularized packages 144 radially inward towards axis of rotation 114.

According to a preferred mode of operation, as non-singularized packages 144 are rotated upon rotating conveyor 104 through the fourth portion of rotation, reversible sectors 116 drive non-singularized packages 144 radially outward away from axis of rotation 114 to transmit non-singularized packages 144 to reinjection conveyor 112, which in turn reinjects non-singularized packages 144 into the non-singularized stream of upstream conveyor 122. It will be understood that, to implement this mode of operation, as each reversible sector 116 enters the fourth portion of rotation, the direction of rotation of its rollers is reversed. Then, as each reversible sector 116 enters the first portion of rotation, the direction of rotation of the roller is again reversed.

According to an alternative preferred mode of operation (not shown in FIG. 1), as non-singularized packages 144 are rotated upon rotating conveyor 104 through the fourth portion of rotation, reversible sectors 116 continue to drive non-singularized packages 144 radially inward towards axis of rotation 114. Non-singularized packages 144 are then rotated upon rotating conveyor 104 through the first portion of rotation a second time. As non-singularized packages 144 are rotated a second time through the second portion of rotation, reversible sectors 116 drive non-singularized packages 144 radially outward away from axis of rotation 114 to transmit non-singularized packages 144 to output conveyor 106 a second time.

Under either of these two modes of operation, the stream of non-singularized packages 140 on upstream conveyor 122 is eventually transformed into a stream of singularized packages 142 on downstream conveyor 124.

Live rollers 126 of input conveyor 102 preferably accelerate packages 140 as packages 140 are received from upstream conveyor 122 in order to increase the separation between packages 140 in the non-singularized stream. Live rollers 126 are preferably skewed to drive packages 140 towards the left side (in FIG. 1) of input conveyor 102. In one preferred embodiment, packages 140 are accelerated by driving live rollers 126 at the downstream end of input conveyor 102 faster than live rollers 126 at the upstream end of input conveyor 102. In an alternative preferred embodiment, live rollers 126 are all driven at the same 122.

The process of driving packages 140 towards and then away from axis of rotation 114 as packages 140 are rotated upon rotating conveyor 104 also tends to increase the separation between packages 140, thereby assisting the singularization process. In a preferred embodiment, reversible live rollers 118 of sectors 116 convey packages 140 radially outward away from axis of rotation 114 during the second portion of rotation at a rate greater than the rate at which reversible live rollers convey packages 140 radially inward towards axis of rotation 114 during the first portion of rotation. Those skilled in the art will understand that this also tends to increase package separation, as well as assist singularization. It will also be understood by those skilled in the art that individual packages 140 tend to be separated onto different sectors 116 for singularization due to the fact that sectors 116 narrow towards the center of rotating conveyor 104.

Output conveyor 106 comprises live rollers 128 that are preferably skewed to justify and orient singularized packages 142 along the left side (in FIG. 1) of output conveyor 106. Vertical belt conveyor 108 is driven in the downstream direction to assist in the conveyance of justified packages 142. In a preferred embodiment, vertical conveyor 108 is driven faster than output conveyor 106. Those skilled in the art will understand that these different speeds may assist in the singularization of packages by destabilizing non-singularized packages on output conveyor 106.

In a preferred embodiment, output conveyor 106 is sufficiently narrow such that the center of gravity of a non-singularized package 144 may be located over the right edge (in FIG. 1) of output conveyor 106. In addition, return conveyor 110 is preferably slightly lower than output conveyor 106. As a result, non-singularized packages 144 may be removed from output conveyor 106 to return conveyor 110 by falling off output conveyor 106 and onto return conveyor 110. On the other hand, output conveyor 106 is preferably sufficiently wide such that a singularized package 142 will not fall onto return conveyor 110.

Live rollers 130 of return conveyor 110 are driven to urge non-singularized packages 144 upstream to return to rotating conveyor 104. Those skilled in the art will understand that the width of output conveyor 106 and the slight difference in elevation between output conveyor 106 and return conveyor 110 (like all the dimensions of apparatus 100) are dependent upon the range of sizes of the packages (or other objects) to be singularized by the particular embodiment of apparatus 100. For example, to singular packages ranging in size from a smallest side of about 12 inches to a largest side of about 24 inches, output conveyor 106 is preferably about 10 inches wide and about one-quarter inch higher than return conveyor 110.

In a preferred embodiment, reinjection conveyor 112 comprises saturation section 132 and re-entry section 134. The purpose of reinjection conveyor 112 is to return non-singularized packages 144 to the upstream non-singularized stream for another chance to be singularized. Saturation section 132 acts as a temporary storage area for packages during periods of high package volume flow. Re-entry section 134 moves the non-singularized packages 144 back into the non-singularized stream.

Figure 3:
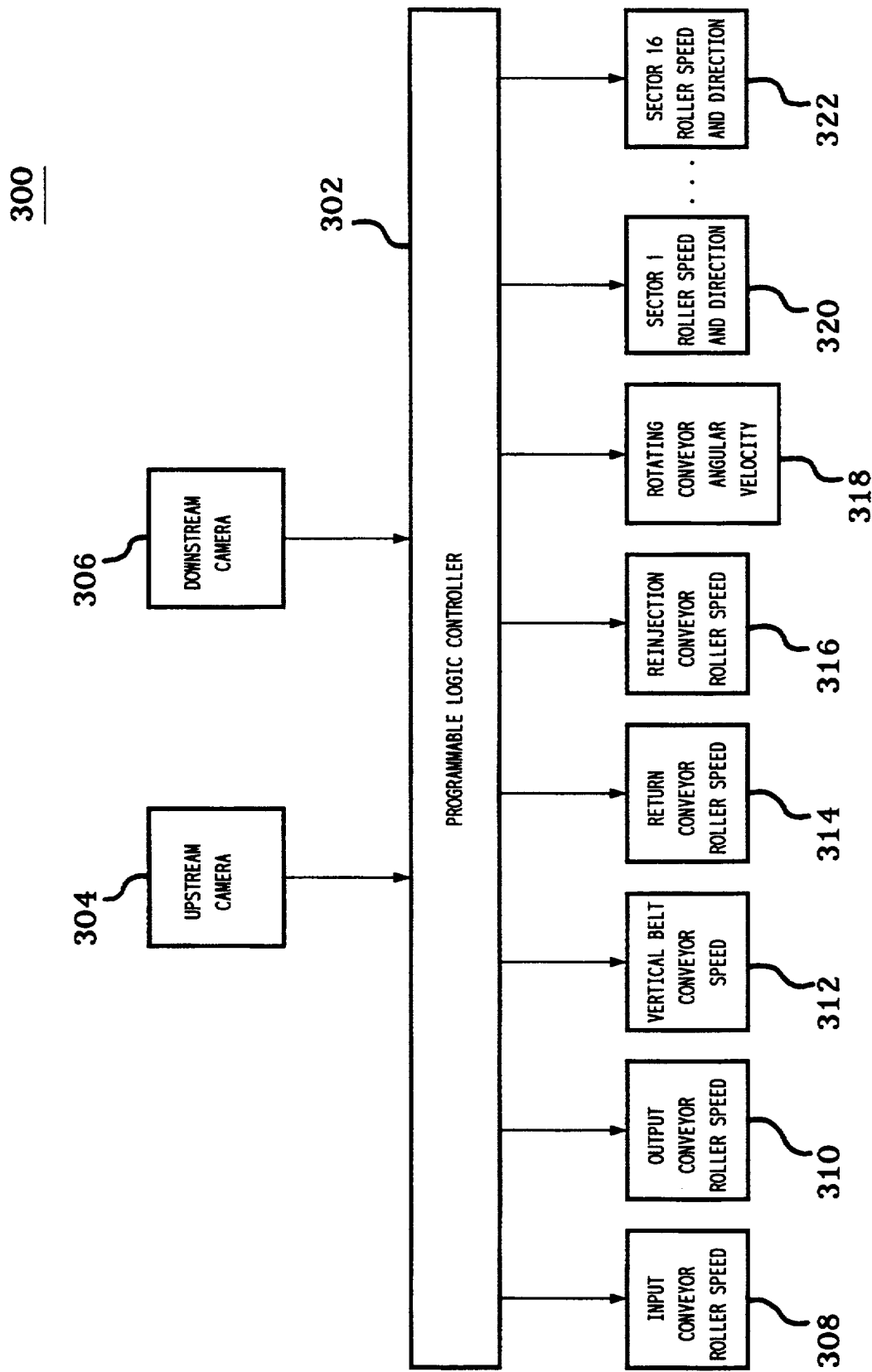
FIG. 3 is a block diagram of the control system for controlling the operations of the apparatus of FIG. 1.

Referring now to FIG. 3, there is shown a block diagram of control system 300 for controlling the operations of apparatus 100, according to a preferred embodiment of the present invention. Control system 300 comprises programmable logic controller (PLC) 302, upstream camera 304, and downstream camera 306. The primary function of PLC 302 is to control the speed and direction of rotation of live rollers 118 of sectors 116 as a function of rotational position of rotating conveyor 104. Upstream camera 304 and downstream camera 306 are optional features that are preferably positioned overhead input conveyor 102 and output conveyor 106 of FIG. 1, respectively. Cameras 304 and 306 generate images of the top surfaces of the conveyors.

When cameras 304 and 306 are present, PLC 302 analyzes the generated images to estimate the current volume of packages on the conveyors. Those skilled in the art will understand that PLC 302 may performed this estimation by determining the percentage of the image area corresponding to packages versus the percentage of the image area corresponding to empty conveyor area, where the conveyor surfaces are preferably painted a selected color not typically found in packages.

Based on the rotational position of rotating conveyor 104 and/or the current package volumes, PLC 302 controls the operations (i.e., speed and direction of the rotation) of the live rollers of apparatus 100 by controlling the various motors that drive the various live rollers. In addition, PLC 302 preferably controls the angular velocity of rotating conveyor 104 by controlling the appropriate motor. For example, if the volume of packages on output conveyor 106 becomes too great to be safely singularized, then PLC 302 may temporarily slow down or stop the transmission of packages to output conveyor 106 by controlling the speed and direction of live rollers 118 of reversible sectors 116 of rotating conveyor 104 in the second portion of rotation. In this way, PLC 302 may retain the packages on rotating conveyor 104—either for transmission to reinjection conveyor 112 during the fourth portion of rotation or for transmission to output conveyor 106 during the second pass through the second portion of rotation. Rotating conveyor 104 may therefore act as a temporary storage device for packages when package flow volume temporarily increases.

Similarly, if the volume of packages on input conveyor 102 becomes too great, then PLC 302 may control live rollers 136 of re-entry section 134 of reinjection conveyor 112 to reduce the volume of packages reinjected into the non-singularized stream of upstream conveyor 122.

In alternative preferred embodiments of the present invention, some of the live rollers (e.g., rollers 126 of input conveyor 102 and rollers 128 of output conveyor 106) may be driven at constant speeds without direct control from PLC 302. Similarly, in a preferred embodiment in which saturation section 132 of reinjection conveyor 112 comprises idle rollers 138, an operator may control the reinjection of packages from reinjection conveyor 112 into the non-singularized stream by manually feeding packages from passive saturation section 132 to active re-entry section 134, which may or may not be directly controlled by PLC 302. In such an embodiment, cameras 304 and 306 are optional. In general, cameras 304 and 306 are optional for relatively homogeneous input flow rates of up to about 5,000 packages/hour.

PLC 302 is preferably a General Electric SLC-500. A microprocessor-based personal computer such as a Compaq DeskPro may also be used in conjunction with or instead of PLC 302 to control the operations of apparatus 100. Alternatively, the operations of apparatus 100 may be controlled by timers that determine the speeds and directions of the live rollers of apparatus 100 and the angular velocity of rotating conveyor 104. In alternative embodiments, photocells and/or shaft encoders may be substituted for timers.

Upstream conveyor 122, downstream conveyor 124, and packages 140, 142, and 144 form no part of the present invention. Upstream and downstream conveyors 122 and 124 may be conveyor belts, roller-based conveyors, slides, chutes, or any other means for actively or passively moving packages. Packages 140, 142, and 144 may be rectangular boxes of varied dimensions.

A particular preferred embodiment of singularizer apparatus 100 of FIG. 1 is capable of singularizing packages at a flow rate of approximately 5,000 packages per hour. In this preferred embodiment, rotating conveyor 104 has a diameter of approximately fifteen feet, is divided into sixteen reversible sectors 116, and rotates horizontally about axis of rotation 114 at approximately sixteen revolutions per minute. Each reversible sector 116 has its own motor (not shown) or individually motorized rollers 118 and is able to be driven independently of each other reversible sector 116. Hubcap 120, the surface of which is a spherical section, is about four feet across and rises about 12 inches above the planar surface of rotating conveyor 104 at its highest point.

Upstream conveyor 122 and input conveyor 102 are each preferably about five feet wide. Upstream conveyor 122 drives packages at approximately 300 feet per minute (FPM), while input conveyor 102 accelerates packages from about 300 FPM to about 490 FPM for transmission to rotating conveyor 104, whose peripheral angular speed is approximately 450 FPM. Live rollers 126 of input conveyor 102 are preferably skewed at an angle of approximately 10 degrees relative to the downstream direction. Input conveyor 102 is preferably about 7 feet long.

During the first portion of rotation, live rollers 118 of reversible sectors 116 of rotating conveyor 104 drive packages radially inward towards axis of rotation 114 at approximately 100 FPM. During the second portion of rotation, live rollers 118 of reversible sectors 116 of rotating conveyor 104 accelerate packages radially outward away from axis of rotation 114 from approximately 350 to 400 FPM. In combination with the peripheral angular speed of rotating conveyor 104, reversible sectors 116 transmit packages to output conveyor 106 at speeds in excess of 500 FPM.

To singularize packages ranging in dimension from about seven inches to about fourteen inches on a side, output conveyor 106 is preferably about fourteen inches wide, about 8 feet long, and drives packages at approximately 500 FPM. Live rollers 128 of output conveyor 106 are preferably skewed at an angle of 10 degrees relative to the downstream direction. Vertical belt conveyor 108 is preferably about twelve inches high, about 22 feet long, and driven downstream at approximately 500 FPM.

Return conveyor 110 is preferably about one-quarter inch lower than output conveyor 106 and drives packages upstream at approximately 400 FPM. Return conveyor 110 is preferably about 5 feet wide at its base and about 10 feet long. During the third portion of rotation, packages are driven radially inward towards axis of rotation 114 at approximately 50 FPM.

When packages are to be retained on rotating conveyor 104, during the fourth portion of rotation, packages are driven radially inward towards axis of rotation 114 at approximately 100 FPM. When packages are to be transmitted to reinjection conveyor 112, during the fourth portion of rotation, packages are driven radially outward away from axis of rotation 114 at approximately 200 FPM. Saturation section 132 of reinjection conveyor 112 is preferably about five feet wide and about 12 feet long. In preferred embodiments of saturation section 132 having live rollers 138, rollers 138 drive packages upstream at approximately 250 FPM. Reentry section 134 of reinjection conveyor 112 preferably has a radius of about five feet wide, curves about ninety degrees towards upstream conveyor 122, and reinjects packages into the non-singularized stream at approximately 300 FPM.

According to an alternative preferred embodiment of the present invention, rollers 118 within a reversible sector 116 of rotating conveyor 104 are driven at different rates. For example, rollers 118 that are closer to axis of rotation 114 may drive packages slower than those rollers 118 further from axis of rotation 114. Those skilled in the art will understand that using different roller speeds tends to increase package separation and thereby improves the singularization process.

It will also be understood by those skilled in the art that the present invention covers the singularization of objects other than packages. For example, apparatus 100 of FIG. 1 may be used to singularize streams of bags. Alternative preferred embodiments of the present invention may be designed and used to singularize other objects. Those skilled in the art will understand that the dimensions and speeds of the singularizer apparatuses of the present invention may vary depending upon the characteristics (e.g., size, geometry, fragility) of the objects to be singularized.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for singularizing objects, comprising:
   (a) rotating means, rotatable about an axis of rotation, for:
       receiving two or more objects in a non-singularized stream;
       rotating said objects about said axis of rotation; and
       transmitting said objects in a singularized stream,
   wherein said rotating means comprises one or more reversible sectors for:
       conveying said objects towards said axis of rotation during a first portion of the rotation of said rotating means and
       conveying said objects away from said axis of rotation during a second portion of the rotation of said rotating means.

2. The apparatus of claim 1, wherein said rotating means conveys said objects towards said axis of rotation during said first portion of the rotation slower than said rotating means conveys said objects away from said axis of rotation during said second portion of the rotation.

3. The apparatus of claim 1, wherein each of said reversible sectors of said rotating means comprises one or more reversible live rollers.

4. The apparatus of claim 1, further comprising:
   (b) a control system for controlling the operations of said rotating means.

5. The apparatus of claim 4, wherein said control system comprises:
   (1) a programmable logic controller; and
   (2) one or more cameras for generating images of said objects used to determine the volume of objects on said apparatus.

6. The apparatus of claim 1, wherein each of said reversible sectors may be driven independently of each other of said reversible sectors.

7. The apparatus of claim 1, wherein said rotating means further comprises center means, located near the center said rotating means, for providing a package stop during low-volume operations and providing package pressure relief during high-volume operations.

8. The apparatus of claim 1, further comprising:
   (b) input means for receiving said non-singularized objects from an upstream source and for transmitting said objects to said rotating means; and
   (c) output means for receiving said objects from said rotating means and for transmitting said singularized objects to a downstream destination.

9. The apparatus of claim 8, wherein said input means comprises one or more live input rollers and said output means comprises one or more live output rollers.

10. The apparatus of claim 9, wherein said output means justifies said objects.

11. The apparatus of claim 9, wherein said output means comprises one or more skewed rollers.

12. The apparatus of claim 8, further comprising:
   (d) vertical conveyor means, adjacent to said rotating means and output means, for urging said objects downstream.

13. The apparatus of claim 8, further comprising:

(d) return means for receiving one or more non-singularized objects from said output means and for returning said non-singularized objects to said rotating means; and (e) reinjection means for receiving said non-singularized objects from said rotating means and for reinjecting said non-singularized objects into said non-singularized stream of objects.

14. The apparatus of claim 13, wherein said reversible sectors of said rotating means convey said non-singularized objects towards said axis of rotation during a third portion of the rotation of said rotating means.

15. The apparatus of claim 14, wherein said reversible sectors of said rotating means convey said non-singularized objects away from said axis of rotation during a fourth portion of the rotation of said rotating means.

16. The apparatus of claim 13, wherein said return means comprises one or more live return rollers and said reinjection means comprises one or more live reinjection rollers.

17. The apparatus of claim 16, wherein said reinjection means comprises a first section of one or more idle rollers and a second section comprising said reinjection rollers.

18. The apparatus of claim 8, wherein said input means accelerates said objects and said output means accelerates said objects.

19. A method for singularizing objects, comprising the steps of: (a) receiving two or more objects in a non-singularized stream from an upstream source;

(b) rotating said objects about an axis of rotation;

(c) conveying said objects towards said axis of rotation during a first portion of the rotation of said objects;

(d) conveying said objects away from said axis of rotation during a second portion of the rotation of said objects;

(e) transmitting said objects in a singularized stream to a downstream destination;

(f) removing one or more non-singularized objects after the rotation of said objects;

(g) reinjecting said objects into said non-singularized stream of step (a); and (h) repeating steps (b), (c), (d), and (e), wherein step (f) further comprises the steps of:
 (1) further rotating said non-singularized objects about said axis of rotation;
 (2) conveying said objects towards said axis of rotation during a third portion of the rotation of said objects; and
 (3) conveying said objects away from said axis of rotation during a fourth portion of the rotation of said objects.

20. The method of claim 19, further comprising the steps of:

(f) removing one or more non-singularized objects after the rotation of said objects;

(g) further rotating said non-singularized objects about said axis of rotation;

(h) conveying said objects towards said axis of rotation during a third portion of the rotation of said objects;

(i) repeating steps (d) and (e).

21. The method of claim 19, wherein the speed of said conveyance of step (d) is greater than the speed of said conveyance of step (c).

22. An apparatus for singularizing objects, comprising:

(a) input means for receiving two or more objects in a non-singularized stream from an upstream source and for conveying said objects;

(b) rotating means, rotatable about an axis of rotation, for receiving said objects from said input means and for rotating said objects about said axis of rotation;

(c) output means for receiving said objects from said rotating means and for transmitting said objects in a singularized stream to a downstream destination;

(d) vertical conveyor means, adjacent to said output means, for assisting in the conveyance of said singularized objects;

(e) return means for receiving one or more non-singularized objects from said output means and for returning said non-singularized objects to said rotating means;

(f) reinjection means for receiving said non-singularized objects from said rotating means and for reinjecting said non-singularized objects into said non-singularized stream of objects; and (g) a control system for controlling the operations of said rotating means, wherein:

said rotating means comprises sixteen reversible sectors for:
 (1) conveying said objects towards said axis of rotation during a first portion of the rotation of said rotating means;
 (2) conveying said objects away from said axis of rotation during a second portion of the rotation of said rotating means;
 (3) conveying said objects towards said axis of rotation during a third portion of the rotation of said rotating means; and
 (4) conveying said objects away from said axis of rotation during a fourth portion of the rotation of said rotating means;

each of said reversible sectors comprises one or more reversible live rollers;

each of said reversible sectors may be driven independently of each other of said reversible sectors;

said rotating means further comprises center means located near the center of said rotating means, wherein said center means acts as a package stop during low-volume operations and provides package pressure relief during high-volume operations; and each of said input means, said output means, said return means, and said reinjection means comprises one or more live rollers.

23. The apparatus of claim 22, wherein said control system comprises:
 (1) a programmable logic controller; and
 (2) one or more cameras for generating images of said objects used to determine the volume of objects on said apparatus.

24. An apparatus for singularizing objects, comprising: p1 (a) substantially horizontal conveying means for conveying two or more non-singularized objects in a first substantially horizontal direction;

(b) output means for receiving said objects from said horizontal means; and (c) substantially vertical conveying means, adjacent to said horizontal means and said output means, wherein said horizontal means drives said objects into contact with said vertical means and said vertical means urges said objects in a second direction and onto said output means, wherein:

said horizontal means comprises one of a plurality of reversible sectors of a rotating means;

said rotating means is rotatable about an axis of rotation, receives said objects in a non-singularized stream, rotates said objects about said axis of rotation, and transmits said objects into contact with said vertical means and onto said output means; and said reversible sectors convey said objects towards said axis of rotation during a first portion of the rotation of said rotating means and convey said objects away from said axis of rotation during a second portion of the rotation of said rotating means.

25. The apparatus of claim 24, wherein said output means conveys said objects in said second direction.

26. The apparatus of claim 24, wherein said reversible sectors convey said objects towards said axis of rotation during said first portion of the rotation slower than said reversible sectors convey said objects away from said axis of rotation during said second portion of the rotation.

27. The apparatus of claim 24, wherein each of said reversible sectors of said rotating means comprises one or more reversible live rollers.

28. The apparatus of claim 24 further comprising:
(d) a control system for controlling the operations of said rotating means.

29. The apparatus of claim 28, wherein said control system comprises:
(1) a programmable logic controller; and
(2) one or more cameras for generating images of said objects used to determine the volume of objects on said apparatus.

30. The apparatus of claim 24, wherein each of said reversible sectors may be driven independently of each other of said reversible sectors.

31. The apparatus of claim 24, wherein said rotating means further comprises center means, located near the center of said rotating means, for providing a package stop during low-volume operations and providing package pressure relief during high-volume operations.

32. The apparatus of claim 24, further comprising:
(d) input means for receiving said non-singularized objects from an upstream source and for transmitting said objects to said rotating means.

33. The apparatus of claim 24, further comprising:
(d) return means for receiving one or more non-singularized objects from said output means and for returning said non-singularized objects to said rotating means; and
(e) reinjection means for receiving said non-singularized objects from said rotating means and for reinjecting said non-singularized objects into said non-singularized stream of objects.

34. The apparatus of claim 33, wherein said reversible sectors of said rotating means convey said non-singularized objects towards said axis of rotation during a third portion of the rotation of said rotating means.

35. The apparatus of claim 34, wherein said reversible sectors of said rotating means convey said non-singularized objects away from said axis of rotation during a fourth portion of the rotation of said rotating means.

36. A method for singularizing objects, comprising the steps of:
(a) moving two or more non-singularized objects upon a substantially horizontal first surface in a first direction into contact with a substantially vertical surface;
(b) urging said objects by said vertical surface in a second direction onto a substantially horizontal second surface; and
(c) moving said singularized objects upon said second horizontal surface, wherein step (a) comprises the steps of:
(1) receiving said non-singularized objects from an upstream source onto said first surface;
(2) rotating said objects upon said first surface about an axis of rotation;
(3) moving said objects upon said first surface towards said axis of rotation during a first portion of the rotation of said objects; and
(4) moving said objects upon said first surface away from said axis of rotation into contact with said vertical surface, wherein said first surface comprises active means in said first surface for moving said objects towards and away from said axis of rotation.

37. The method of claim 36, wherein the speed of said moving of step (c) is greater than the speed of said moving of step (a).

38. The method of claim 36, further comprising the steps of:
(d) removing one or more non-singularized objects after step (c);
(e) reinjecting said objects into said non-singularized stream of step (a)(1); and
(f) repeating steps (a)(2), (a)(3), (a)(4), (b), and (c).

39. The method of claim 38, wherein step (d) further comprises the steps of:
(1) further rotating said non-singularized objects about said axis of rotation;
(2) conveying said objects towards said axis of rotation during a third portion of the rotation of said objects; and
(3) conveying said objects away from said axis of rotation during a fourth portion of the rotation of said objects.

40. The method of claim 36, further comprising the steps of:
(d) removing one or more non-singularized objects after step (c);
(e) further rotating said non-singularized objects about said axis of rotation;
(f) conveying said objects towards said axis of rotation during a third portion of the rotation of said objects; and
(g) repeating steps (a)(4), (b), and (c).

41. The method of claim 36, wherein the speed of said moving of step (a)(4) is greater than the speed of said moving of step (a)(3).

42. A method for singularizing objects, comprising the steps of:
(a) receiving two or more objects in a non-singularized stream from an upstream source onto a supporting surface;
(b) rotating said objects on said supporting surface about an axis of rotation;
(c) conveying said objects towards said axis rotation during a first portion of the rotation of said objects;
(d) conveying said objects away from said axis of rotation during a second portion of the rotation of said objects, wherein said supporting surface comprises active means in said supporting surface for conveying said objects towards and away from said axis of rotation; and (e) transmitting said objects in a singularized stream to a downstream destination.

43. The method of claim 42, wherein said active means in said supporting surface convey said objects towards and away from said axis of rotation by urging the bottoms of said objects.

44. A method for singularizing objects, comprising the steps of:
(a) receiving two or more objects in a non-singularized stream from an upstream source;
(b) rotating said objects about an axis of rotation upon a rotating device;
(c) conveying said objects towards said axis of rotation during a first portion of the rotation of said objects;
(d) conveying said objects away from said axis of rotation during a second portion of the rotation of said objects;
(e) transmitting said objects in a singularized stream to a downstream destination;
(f) removing one or more non-singularized objects from the rotating device after the rotation of said objects;
(g) reinjecting said non-singularized objects into said non-singularized stream of step (a); and
(h) repeating steps (b), (c), (d), and (e) for said non-singularized objects.

45. A method for singularizing objects, comprising the steps of:
(a) receiving two or more objects in a non-singularized stream from an upstream source;
(b) rotating said objects about an axis of rotation upon a rotating device;
(c) conveying said objects towards said axis of rotation during a first portion of the rotation of said objects;
(d) conveying said objects away from said axis rotation during a second portion of the rotation of said objects;
(e) transmitting said objects in a singularized stream to a downstream destination;
(f) removing one or more non-singularized objects from the rotating device after the rotation of said objects;
(g) reinjecting said non-singularized objects onto the rotating device;
(h) further rotating said non-singularized objects about said axis of rotation;
(i) conveying said non-singularized objects towards said axis of rotation during a third portion of the rotation of said non-singularized objects; and
(j) repeating steps (d) and (e) for said non-singularize objects.

* * * * *

UNITED STATES PATENT AND TRADEMARK OFFICE
CERTIFICATE OF CORRECTION

PATENT NO.   : 5,372,238
DATED        : December 13, 1994
INVENTOR(S)  : Henri Bonnet It is certified that error appears in the above-indentified patent and that said Letters Patent is hereby corrected as shown below:

Column 12, line 58, delete "p1".

Signed and Sealed this

Sixth Day of June, 1995

Attest:

BRUCE LEHMAN

Attesting Officer        Commissioner of Patents and Trademarks